US012793583B2

(12) United States Patent
Popp

(10) Patent No.: US 12,793,583 B2
(45) Date of Patent: Nov. 10, 2026

(54) SOFT SIGNAGE DISPLAY

(71) Applicant: The IMAGINE GROUP, LLC, Shakopee, MN (US)

(72) Inventor: Mark Richard Popp, Jordan, MN (US)

(73) Assignee: The IMAGINE GROUP, LLC, Shakopee, MN (US)

(*) Notice: Subject to any disclaimer, the term of this patent is extended or adjusted under 35 U.S.C. 154(b) by 132 days.

(21) Appl. No.: 18/819,813

(22) Filed: Aug. 29, 2024

(65) Prior Publication Data

US 2025/0078689 A1 Mar. 6, 2025

Related U.S. Application Data

(60) Provisional application No. 63/535,224, filed on Aug. 29, 2023.

(51) Int. Cl.
*G09F 7/18* (2006.01)
*B29C 65/00* (2006.01)
(Continued)

(52) U.S. Cl.
CPC ................ *G09F 7/18* (2013.01); *B29C 65/04* (2013.01); *B29C 66/4722* (2013.01);
(Continued)

(58) Field of Classification Search
CPC ... G09F 7/18; G09F 2007/1843; B29C 65/04; B29C 66/73116
See application file for complete search history.

(56) References Cited

U.S. PATENT DOCUMENTS 3,294,272 A * 12/1966 Nagler ..................... B64D 1/16 229/245
6,250,002 B1 6/2001 Wittenberg
(Continued)

FOREIGN PATENT DOCUMENTS

EP 1805747 B1 10/2013
JP 2017032712 A * 2/2017 ......... G09F 15/0068

OTHER PUBLICATIONS

International Search Report and Written Opinion in International Appln. No. PCT/US2024/044487, mailed on Nov. 14, 2024, 12 pages.

*Primary Examiner* — Gary C Hoge
(74) *Attorney, Agent, or Firm* — Winthrop & Weinstine, P.A.

(57) ABSTRACT

A soft signage, or soft signage piece, is disclosed. The soft signage comprises a display and a frame. The display comprises a substrate and a strip of material. The display is sized to fit tightly within the frame. The substrate may be a natural or synthetic material. In some embodiments, the substrate is a polyester fabric. The fabric has a graphic printed on at least one side thereof. The graphic may extend edge to edge of the fabric. The display includes a strip of material attached along the substrate edges using welding. The strip of material may be referred to as a keder. In some embodiments, the welding comprises RF welding. The display, comprising a printed substrate and welded strip of material, may comprise a silicon edge graphic (SEG). The frame may be formed in any suitable shape and size and includes a recessed groove or slot for receiving the strip of material on the substrate. The frame may comprise any suitable material such as, for example, extruded aluminum.

12 Claims, 16 Drawing Sheets

(51) Int. Cl.

| | |
|---|---|
| ***B29C 65/04*** | (2006.01) |
| *B29K 27/06* | (2006.01) |
| *B29L 31/00* | (2006.01) |

(52) U.S. Cl.
CPC ... *B29K 2027/06* (2013.01); *B29L 2031/7232* (2013.01); *G09F 2007/1843* (2013.01)

(56) References Cited

U.S. PATENT DOCUMENTS

| | | | | |
|---|---|---|---|---|
| 2007/0095474 | A1* | 5/2007 | Weller | B29C 66/91645 156/309.6 |
| 2012/0021186 | A1* | 1/2012 | Schneider | B29C 66/21 156/60 |
| 2013/0218116 | A1* | 8/2013 | Schneider | B29C 66/7294 156/308.2 |
| 2021/0294197 | A1* | 9/2021 | Ducasteele | G03B 21/58 |
| 2022/0106807 | A1* | 4/2022 | Tibbetts | E04F 10/02 |
| 2024/0209241 | A1* | 6/2024 | Duggal | B29C 65/4815 |
| 2024/0257669 | A1* | 8/2024 | Lamberts | G09F 15/0018 |
| 2024/0408838 | A1* | 12/2024 | Arrieta | B32B 38/145 |

* cited by examiner

SOFT SIGNAGE DISPLAY

CROSS-REFERENCE TO RELATED APPLICATIONS

The present disclosure claims priority to Provisional Application No. 63/535,224, entitled SOFT SIGNAGE DISPLAY, and filed Aug. 29, 2023, the content of which is hereby incorporated by reference herein in its entirety.

FIELD OF THE INVENTION

The present disclosure relates to a novel and advantageous method of applying a strip of material to a substrate to produce a display such as may be used for soft signage, and the display resulting from such manner of application. Particularly, the present disclosure relates to a novel and advantageous method of applying a strip of meltable material to a substrate to produce a display such as may be used for soft signage that is not labor intensive and wherein the strip of meltable material may be easily removed from the substrate, and the display resulting from such manner of application. More particularly, the present disclosure relates to a novel and advantageous method of welding a keder to a natural or synthetic substrate to produce a display such as may be used for soft signage that is not labor intensive and wherein the keder may be easily removed from the natural or synthetic substrate, and the display resulting from such welding.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Soft, or fabric, signage is the usage of soft materials, such as natural or synthetic fiber fabric, for graphic display. Soft signage can include banners, flags, and other displays wherein is digital print methods are used to direct print or sublimate onto a fabric. In some uses, the resultant display (e.g., the printed fabric) is hung or suspended in some manner. Soft signage can either enable the creation of certain products, such as printed banners or flags, or can replace existing products for easier delivery, transport, and use. Many hard signage products, which were previously printed on hard surfaces like plastic, can benefit from this transition.

Soft signage is increasingly popular in retail environments. Soft signage is easier to ship at much lower costs than many traditional offerings (such as rigid prints) and is easy to install by store personnel. Further, off vibrant and permanent graphics on soft signage can be backlit. Each of these characteristics add to the appeal of soft signage.

Frequently soft signage are silicon edge graphic displays (SEG) comprising a printed fabric and a frame. The fabric is sized to fit tightly within the frame and may be a natural or synthetic material such as polyester. The fabric has a graphic printed on at least one side thereof. The graphic may extend edge to edge of the fabric. The fabric includes a rubberized strip of material, described more fully below, attached along (proximate or at) the edges. The frames are available in many shapes and sizes from very small to as long and wide as, for example, 10' by 30' with the size of the fabric correlating to the size of the frame. The frame includes a recessed groove or slot for receiving the strip of material on the fabric. The frame may comprise any suitable material such as, for example, extruded aluminum.

Silicone edge graphic displays get their name from the thin strip of material, referred to as a keder, that is traditionally sewn into the edge of the fabric. FIG. 1 illustrates a strip of material 2 as stitched to the edge of a fabric 4. The material of the strip may be silicon, as the name implies, but can alternatively be a polyvinyl chloride (PVC) material or other material. The strip of material includes a removal tab. The strip of material, as attached to the edge of the fabric, is pressed snugly into a recessed groove or slot within a frame, which allows a user to pull the fabric tight for a seamless, wrinkle-free appearance, thereby forming a soft signage display. Generally speaking, the strip of material, as applied to the fabric, is friction fit into the groove/slot such that it holds the fabric in place until actively removed. Frames for silicone edge graphics are typically thin, giving the displays a near frameless appearance.

The signage is easily assembled by pressing the strip of material into the frame's recessed grooves/slots. The fabric can typically be put in the frame in minutes and often requires only one person. To remove the fabric from the frame, a user pulls a sewed-in tab, which operates to pull a portion of the strip of material from the groove/slot such that a user can continue pulling along the groove/slot to remove the strip of material entirely from the groove/slot.

Unlike many other displays, SEG displays can fold up for easy transport and storage. The fabric is lightweight and easy to install and take down, beneficial for using at trade shows or in an environment where frequent signage changes are necessary, such as retail or trade show environments. Shipping costs for these types of displays are often significantly less expensive than other traditional displays because they are so lightweight and take up much less space than traditional printed graphics.

To manufacture a soft signage display, a piece of fabric is printed with the graphic. After printing, the fabric is trimmed to size for fit into a desired frame. Because certain types of fabric fray, the fabric is typically cut with a laser to seal the edge of the fabric against fraying. A strip of keder material is then sewn to the edges of the fabric. More specifically, an industrial sewing machine is generally used to sew the strip of keder material to each edge of the fabric that is intended to be fit into a frame.

The sewing process requires an acquired skill of industrial sewing by lower wage employees. It is typically a slow process. On larger pieces of fabric, it can take an experienced sewer 10 minutes to sew the keder on a single piece. Additionally, since the frame is made from extruded aluminum, the display must be sewn straight and square to fit acceptably. For example, for a 30' length of fabric, the stitching must be done within a variance suitable for the stretch of the keder and the fabric. This may be, for example, a 1⁄86" variance. Sewing short results in the display being unable to fit in the frame. Sewing long, or even slightly crooked, results in a pucker in the fabric. Both are unacceptable for the end user. The labor pool for sewing, especially for skilled sewing of a keder to the edge of a piece of fabric, is on a downward decline.

There is a current sustainability trend by users of soft signage to recycle fabric after use. Polyester material may be melted for reuse. However, sewing the keder onto the fabric presents a challenge to recycling the fabric. More specifically, resins cannot be included with a piece of fabric sent for recycling. Accordingly, to recycle the fabric, the keder must be removed by removing sewing thread on each piece of material and separating the keder from the fabric. This is labor intensive and makes recycling less practical.

Thus, there is a need in the art for a less labor intensive manner of applying a keder to a fabric to produce a display for soft signage wherein the keder may be easily removed from the fabric.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is not intended to identify key or critical elements of all embodiments, or delineate the scope of any or all embodiments.

A soft signage piece, also referred to as soft signage, is disclosed. The soft signage comprises a display and a frame. The display comprises a substrate and a strip of material. The display is sized to fit tightly within the frame. The substrate may be a natural or synthetic material. In some embodiments, the substrate is a polyester fabric. Accordingly, "piece of fabric" or "fabric" may be used interchangeably with "substrate" herein. The substrate has a graphic printed on at least one side thereof. The graphic may extend fully between all edges of the substrate. Alternatively, some portion of the substrate may be left unprinted. The display includes a strip of material attached along edges of the substrate using welding. The strip of material may be referred to as a keder. In some embodiments, the welding comprises RF welding. The display, comprising a printed substrate and one or more welded strips of material, may comprise a silicon edge graphic (SEG). The frame may be formed in any suitable shape and size and includes a recessed groove or slot for receiving the strip(s) of material on the substrate. The frame may comprise any suitable material such as, for example, extruded aluminum.

A method of making a soft signage piece is provided. In accordance with one embodiment, the method comprises forming a display, providing a frame, and inserting a portion of the display into the frame. Forming a display comprises providing a substrate, providing at least one strip of material, and adhering the strip of material to the substrate. Adhering the strip of material to the substrate comprises melting the strip of material into the substrate proximate a substrate edge, wherein melting the strip of material does not melt the substrate, and allowing the strip of material to solidify. The frame has a slot or opening extending proximate a periphery of at least one edge of the frame. Inserting a portion of the display into the frame comprise inserting the strip of material adhered to the substrate into the slot.

Melting the strip of material into the substrate may be done using RF (Radio Frequency) welding. The material of the strip may comprise a resin. The strip of material may be adhered to the substrate at a landing position on the substrate. The substrate may have a substrate area and the frame has a frame area. The substrate area is larger than the frame area, with the landing position of the substrate being a portion of the substrate area that extends beyond the frame area. Inserting the solidified strip of material and adhered substrate into the slot may achieve a friction fit. In some embodiments, four strips of material are provided and each strip of material is adhered to the substrate proximate a different substrate edge. The method may further comprise printing a graphic on at least one side of the substrate.

A soft signage piece is provided. In accordance with one embodiment, the soft signage piece comprises a display and a frame, wherein a portion of the display is inserted into the frame. The display may comprise a substrate and at least one strip of material, wherein the strip of material is adhered to the substrate by being melted into the substrate proximate a substrate edge and solidified. The frame may comprise an opening and at least one slot arranged proximate a periphery of an edge of the frame, wherein the slot has a height and a depth forming a channel. The strip of material adhered to the substrate is inserted into the slot. Melting the material of the strip to adhere it to the substrate does not melt the material of the substrate.

The strip of material may be adhered to the substrate at a landing position on the substrate. The substrate may have a substrate area and the frame may have a frame area. The substrate area is larger than the frame area, with the landing position being a portion of the substrate area that extends beyond the frame area. The substrate may be porous and the strip of material may melt into pores of the substrate. The strip of material may be a keder, may comprise a resin, and/or may be rectangular. A graphic may be printed on one side of the substrate.

The display may comprise four strips of material and each strip of material may be adhered to the substrate proximate a different substrate edge. A space may be provided at corners of the substrate between each adhered strip of material.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to a novel and advantageous method of applying a strip of material to a substrate to produce a display such as may be used for soft signage, and the display resulting from such manner of application. Particularly, the present disclosure relates to a novel and advantageous method of applying a strip of meltable material to a substrate to produce a display such as may be used for soft signage that is not labor intensive and wherein the strip of meltable material may be easily removed from the substrate, and the display resulting from such manner of application. More particularly, the present disclosure relates to a novel and advantageous method of welding a keder to a natural or synthetic substrate to produce a display such as may be used for soft signage that is not labor intensive and wherein the keder may be easily removed from the natural or synthetic substrate, and the display resulting from such welding. The disclosed method improves speed of making signage and ability to recycle fabric used in soft signage.

A soft signage, or soft signage piece, is disclosed. The soft signage comprises a display and a frame. The display comprises a substrate and a strip of material. The display is sized to fit tightly within the frame. The substrate may be woven and may be a natural or synthetic material. In some embodiments, the substrate is a polyester fabric. The fabric may have a graphic printed on at least one side thereof. The graphic may extend edge to edge of the fabric. The display includes at least one strip of material attached along at least one edge of the substrate using welding. The strip of material may be referred to as a keder. In some embodiments, the welding comprises RF welding. The display, comprising a printed substrate and welded strip of material, may comprise a silicon edge graphic (SEG). The frame may be formed in any suitable shape and size and includes a recessed groove or slot for receiving the strip of material on the substrate. The frame may comprise any suitable material such as, for example, extruded aluminum.

Figure 1:
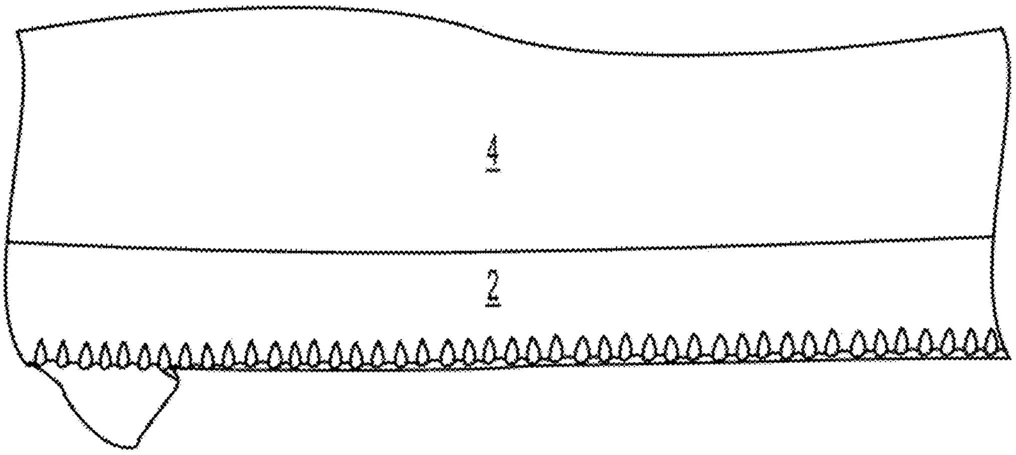
Figure 1 PRIOR ART
FIG. 1 illustrates a view of a strip of material stitched to fabric, in accordance with the prior art.
Figure 2A:
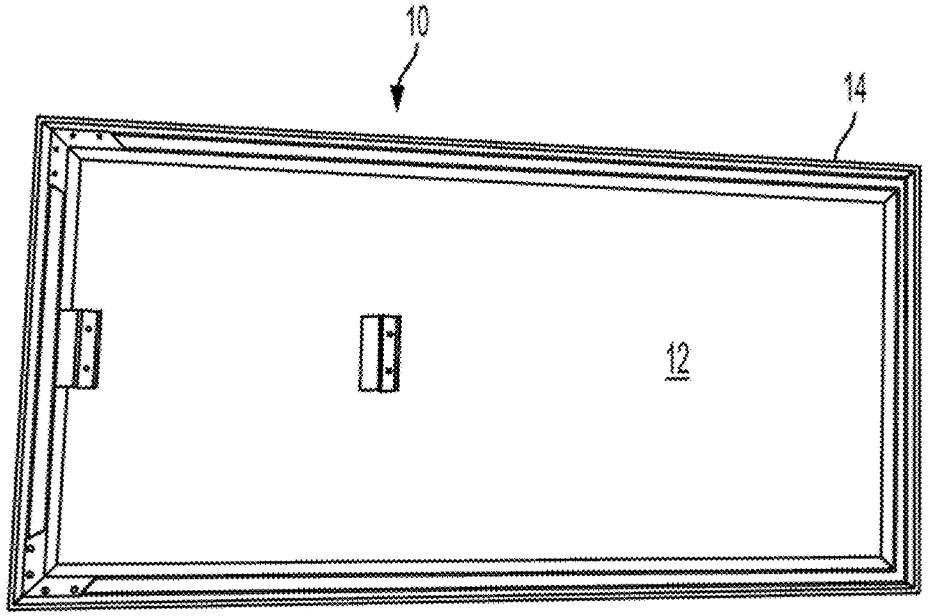
FIG. 2*a* illustrates a frame, in accordance with one embodiment.
Figure 2B:
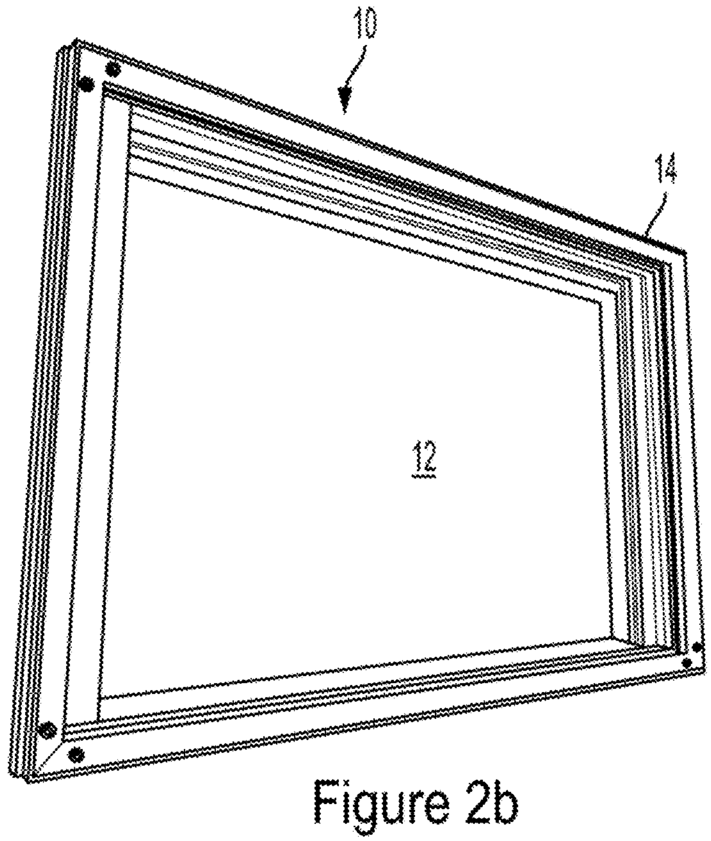
FIG. 2*b* illustrates an alternative view of a frame, in accordance with one embodiment.

FIGS. 2*a* and 2*b* illustrate a frame 10, in accordance with one embodiment. The frame has an opening 12 and includes a slot 14 extending along a periphery thereof. In the embodiment of FIGS. 2*a* and 2*b*, the frame is a rectangle having a perimeter comprising a height and a width. The height and width together form an area (extending between outer edges of the frame). In alternative embodiments, other shapes may be used with the area of the frame being defined as between outer edges of the frame.

Figure 3A:
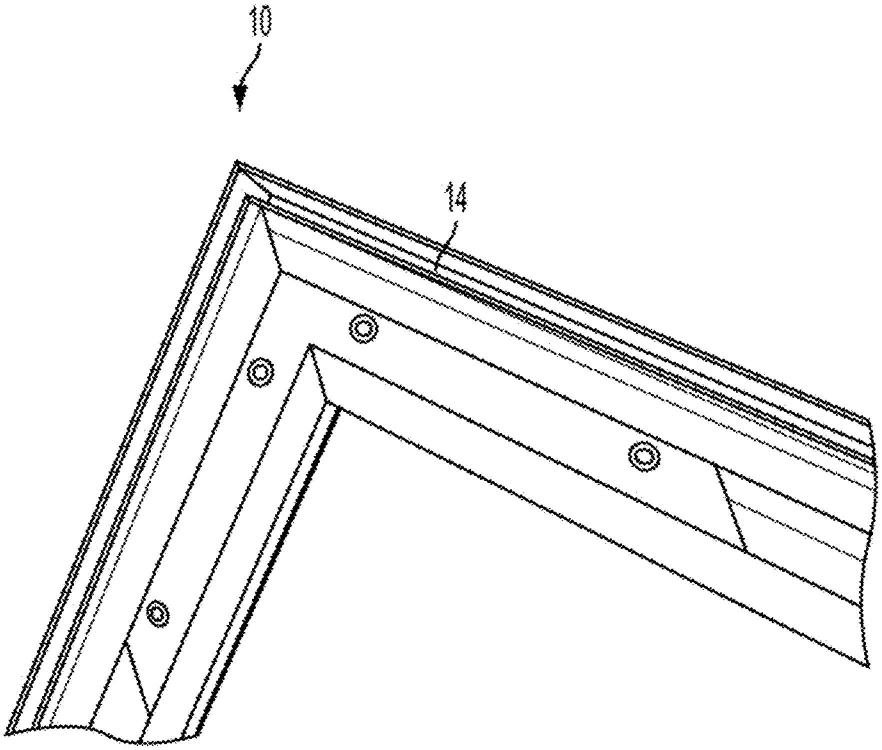
FIG. 3*a* illustrates an exploded view of a slot of a frame, in accordance with one embodiment.
Figure 3B:
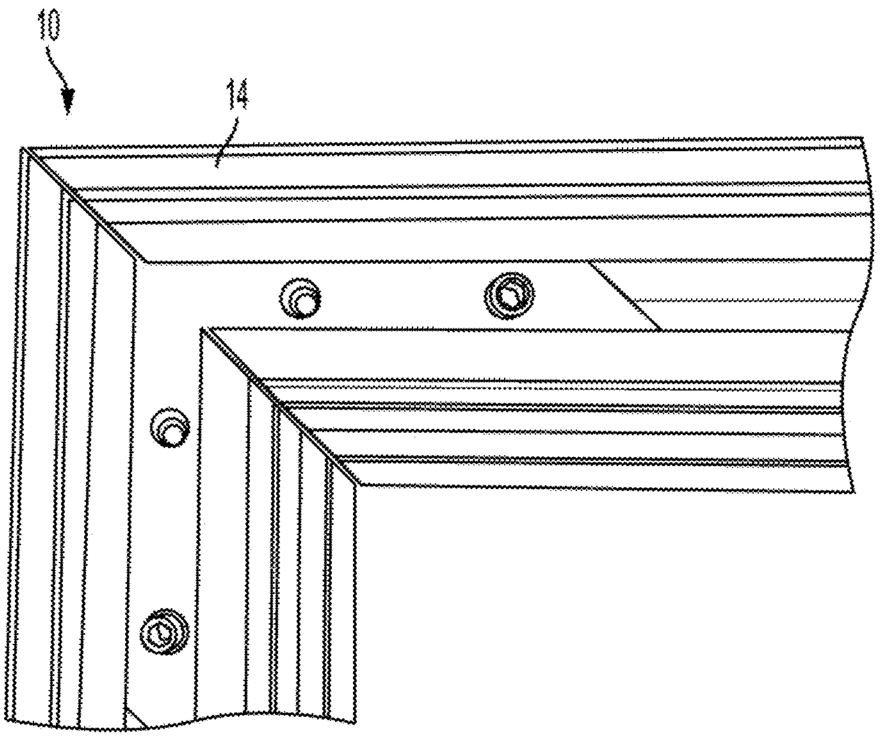
FIG. 3*b* illustrates an alternative exploded view of a slot of a frame, in accordance with one embodiment.

FIGS. 3*a* and 3*b* illustrate a view of a corner of the frame 10 with an exploded view of the slot 14, in accordance with one embodiment. As shown, the slot has a height and a depth forming a channel.

Figure 4A:
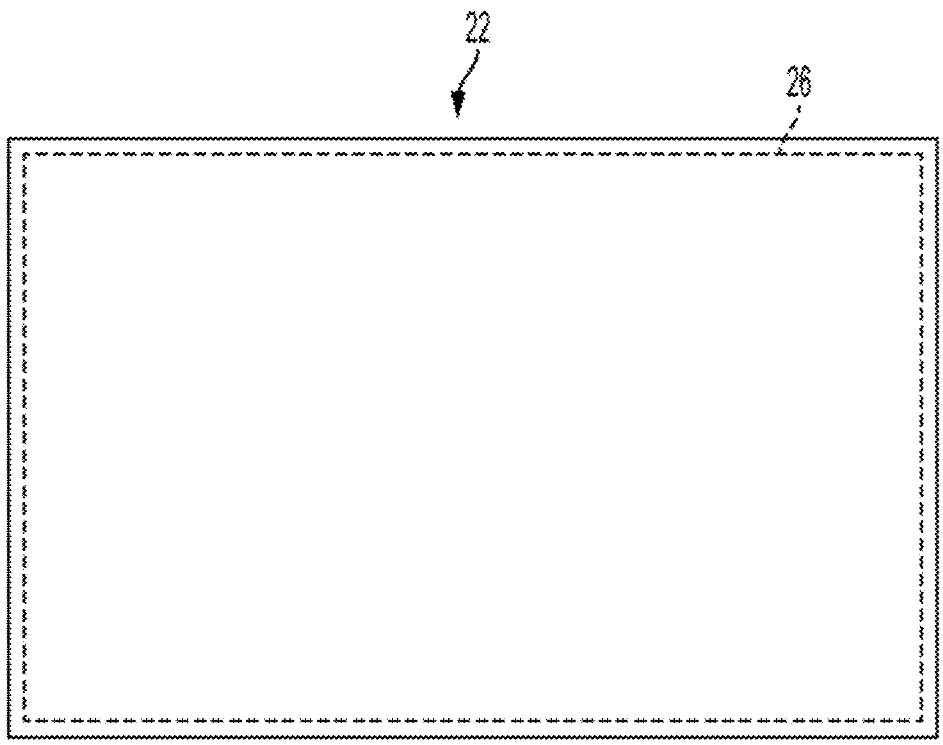
FIG. 4*a* illustrates a substrate, in accordance with one embodiment.
Figure 4B:
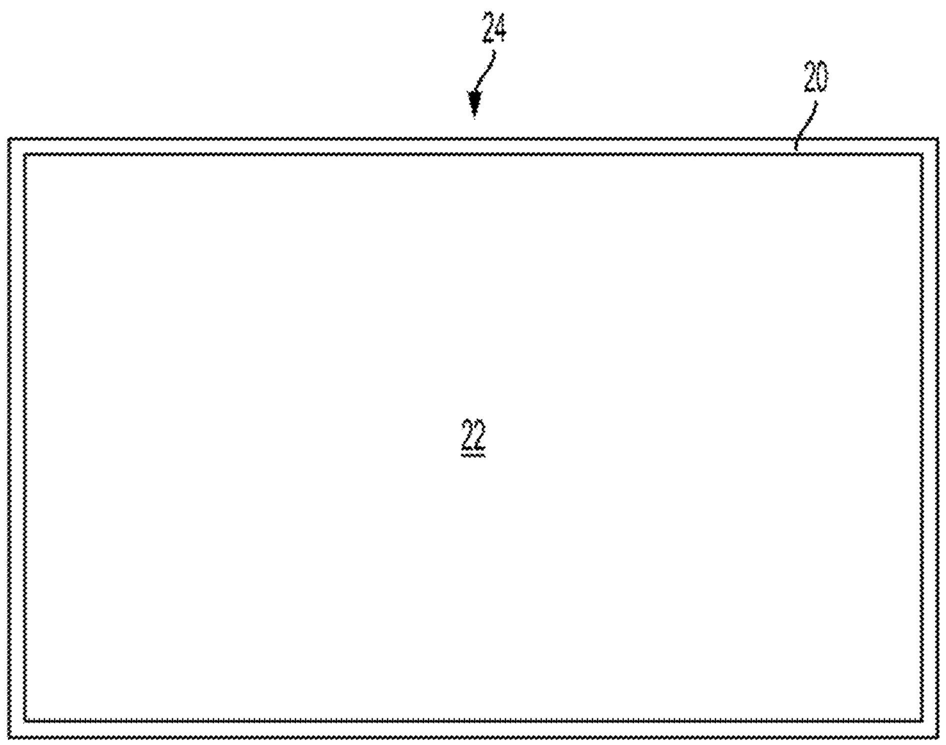
FIG. 4*b* illustrates a display, in accordance with one embodiment.

FIG. 4*a* illustrates a substrate 22 for a display for use in a soft signage piece in accordance with one embodiment. The substrate 22 may comprise any suitable natural or synthetic material having pores for receiving melted strip material. The substrate 22 has an area larger than the area of the frame; the substrate has a height larger than the height of the frame and a width larger than the width of the frame. FIG. 4*a* shows a dotted line 26 corresponding to a perimeter of a frame for receiving the piece of fabric. The space between the dotted line 26 and the edge of the substrate 22 is approximately equal to the width of a strip of material as melted to the substrate 22 and may be referred to as a landing position. The landing position may extend to the edges of the substrate or may end slightly short of the edges of the substrate. FIG. 4*b* illustrates a display 24 comprising a strip of material 20 attached to the substrate 22 at the landing position, in accordance with one embodiment. When the strip of material is attached to the substrate 22 at the landing position, the strip of material 20 is positioned just outside of, and generally abutting, the perimeter of the frame such that the slot of the frame receives the strip of material as applied to the substrate. For example, the landing strip with the strip of material adhered thereto may be folded and inserted into a slot of a frame. In general, the substrate may be printed with a graphic on at least one side thereof. The printing may extend over an area equal to or slightly beyond that of the frame. In alternative embodiments, the substrate may not be printed or the printing may not extend over the entire substrate area equal to the area of the frame.

Figure 5A:
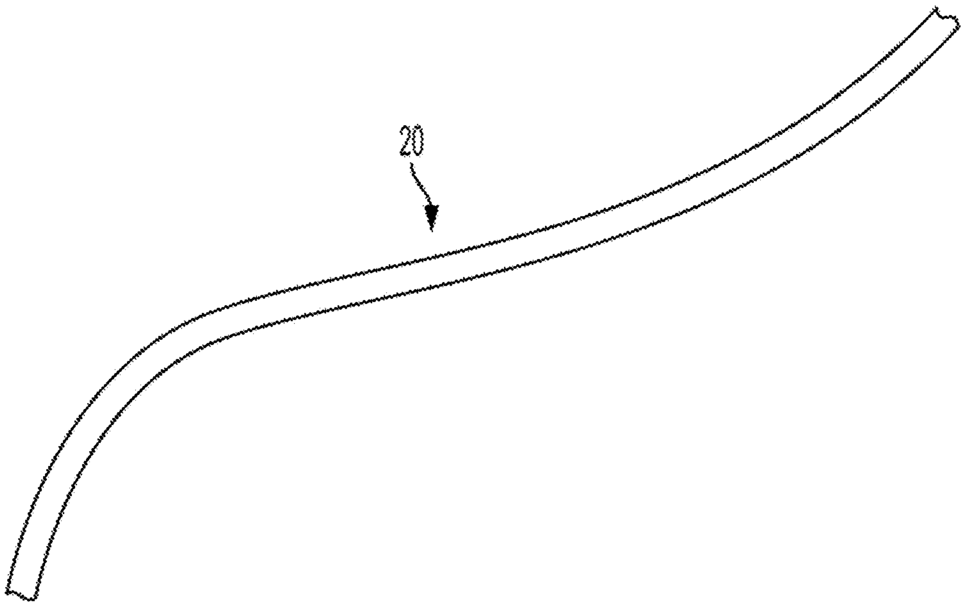
FIG. 5*a* illustrates a strip of material, in accordance with one embodiment.
Figure 5B:
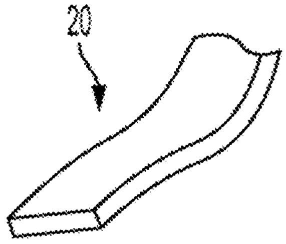
FIG. 5*b* illustrates an end sectional view of the strip of material of FIG. 5*a*.

FIG. 5*a* illustrates a strip of material 20 for attachment to a substrate, in accordance with one embodiment. FIG. 5*b* illustrates a cross sectional view of the strip of material of FIG. 5*a*. The strip of material may comprise any suitable material, such as a resin, that can melt. In general, it may be desirable for the material to have stretchable and flexible properties. The strip of material may be provided in a roll that is cut to desired length.

Before melting to the substrate, the strip of material, also referred to as a keder, may have any suitable cross section. As is discussed more fully below, the strip of material may be melted with a tool that will impart a rectangular cross section to the coupled strip of material. In various embodiments, the pre-melt strip of material may have a rectangular, a square, a round, or other cross section.

The strip of material has a length, a width, and a thickness. In use on the display, after melting to adhere the strip of material to the substrate, the strip of material may have a thickness such that edges of the display (the thickness of the combined substrate and strip of material) may be pressed into the slot of the frame into which it is to be fit. The thickness of the display edges should be sufficient to friction fit into the slot such that the display edge is not released from the slot without application of force. Accordingly, in some embodiments the strip of material as adhered to the substrate may have dimensions corresponding to dimensions of the channel of the slot. More specifically, the adhered strip of material may have a thickness slightly bigger than the height of the channel of the slot and may have any suitable width so long as the strip of material may be inserted into the slot. In general, the width of the strip of material may be less than the depth of the slot but need not be equal to the depth of the slot. It is to be appreciated that the size of the strip of material is selected based on the size of the channel of the slot. More specifically, the strip of material may be sized such that it can be buried in the channel and will not project from the frame.

Figure 5C:
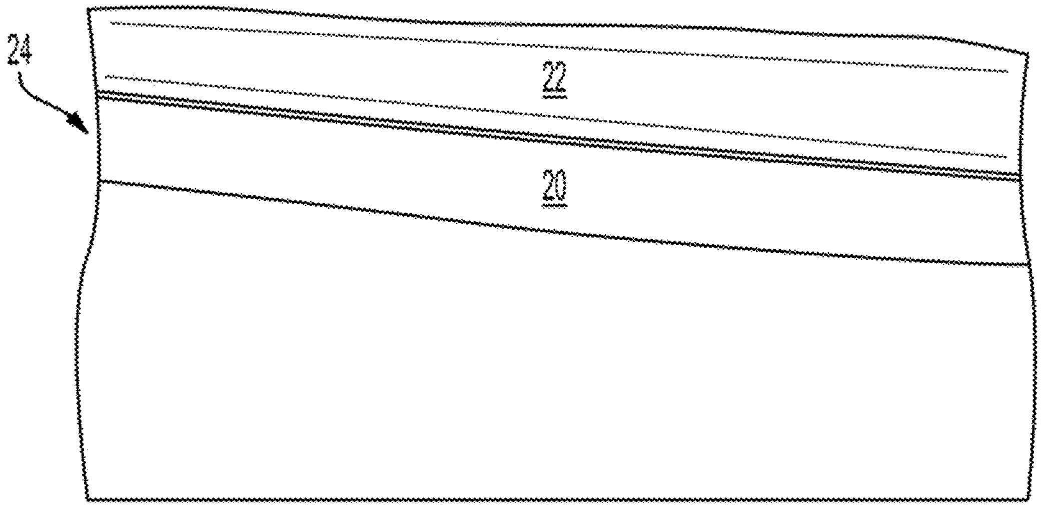
FIG. 5*c* illustrates a rear view of a strip of material applied to a substrate, in accordance with one embodiment.
Figure 5D:
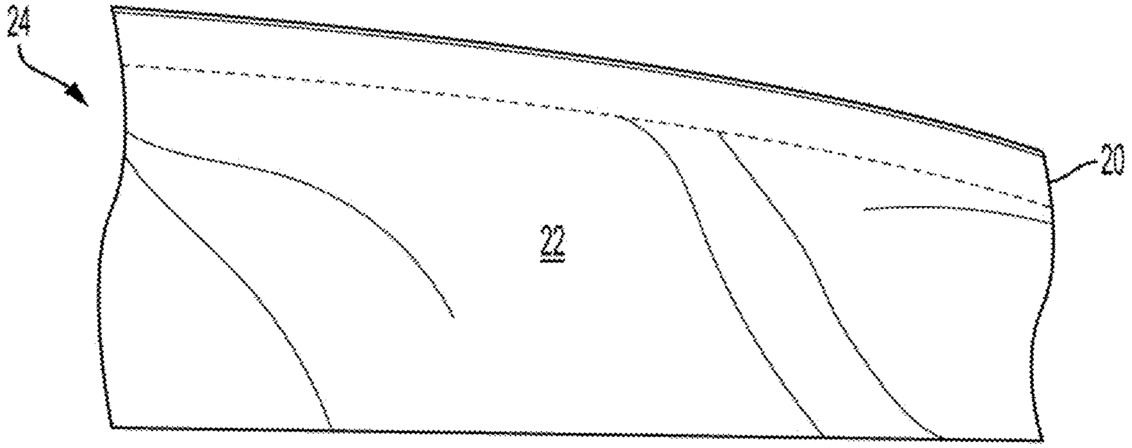
FIG. 5*d* illustrates a front view of a strip of material applied to a substrate, in accordance with one embodiment.

FIG. 5*c* illustrates a rear view of a display 24 comprising a strip of material 20 applied to a substrate 22, in accordance with one embodiment. FIG. 5*d* illustrates a front view of the display 24. As shown, the strip of material 20 is applied to the edge of the substrate 22.

The material for the substrate and the material for the strip are selected such that the melting point of the material of the strip is less than the melting point of the fabric. While the phrase "melting point" is used, it is to be appreciated that melt occurs, in some embodiments, due to a combination of applied voltage and pressure. More specifically, the materials are selected such that at an applied voltage and pressure, the material of the strip melts and is received by pores in the substrate, and the substrate does not melt. Only a portion of the material of the strip may be received by the substrate and it is expected that some portion of the material will remain above the substrate and solidify. Accordingly, as applied to the substrate, the strip of material has a received portion that flowed into pores of the substrate during melting and a projecting portion that remains above the substrate.

In one embodiment, the strip of material may comprise a PVC (polyvinyl chloride), which has a melting point of 180° F., and the substrate may comprise a polyester, which has a melting point of 220° F. During welding, described more fully below, the strip of material and the substrate are subjected to a voltage that raises the materials to a temperature between the melting point of the strip and the melting point of the substrate, such as between 180° F. and 220° F., which causes the strip of material to melt without causing the substrate to melt. The strip of material generally liquifies, is partially absorbed into the substrate, and cools down. In a woven substrate, such as polyester, there are air pockets that allow the strip material to penetrate and grab onto the substrate.

In some embodiments, the material of the strip may be formulated to enhance stickiness or tackiness. For example, additives enhancing the stickiness of the strip of material may be added to a common keder material such as PVC. Alternatively, ingredients that reduce stickiness or tackiness, such as talc, may be removed from the material.

Figure 6:
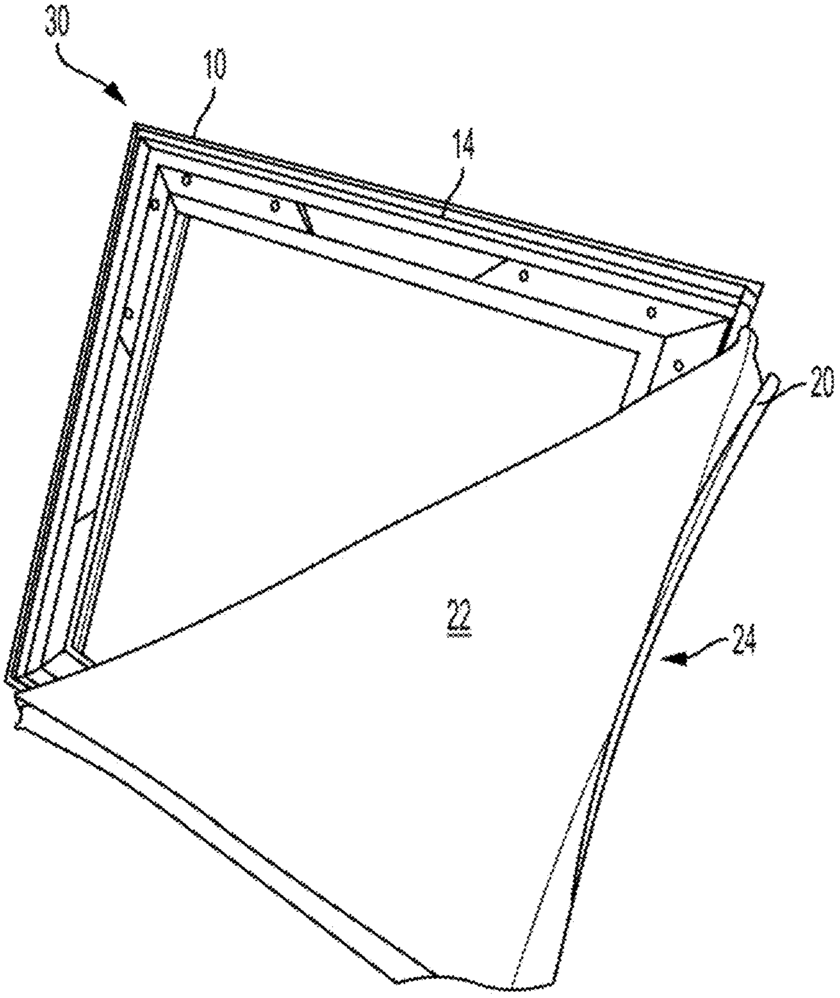
FIG. 6 illustrates a partially assembled soft signage, in accordance with one embodiment.

FIG. 6 illustrates a partially assembled soft signage piece 30. The soft signage piece 30 comprises a display 24 inserted into a frame 10; FIG. 6 illustrates the display only partially inserted into the frame. The display 24 comprises a substrate 22 having a strip of material 20 adhered at each edge thereof. The frame 10 includes a slot 14 along a periphery thereof. The soft signage piece 30 is formed by inserting the edges of the display 24 into the slot 14 of the frame 10. FIG. 6 illustrates a partially assembled soft signage piece 30 wherein two of four edges of the display 24 have been inserted into the slot 14 of the frame 10.

Figure 7:
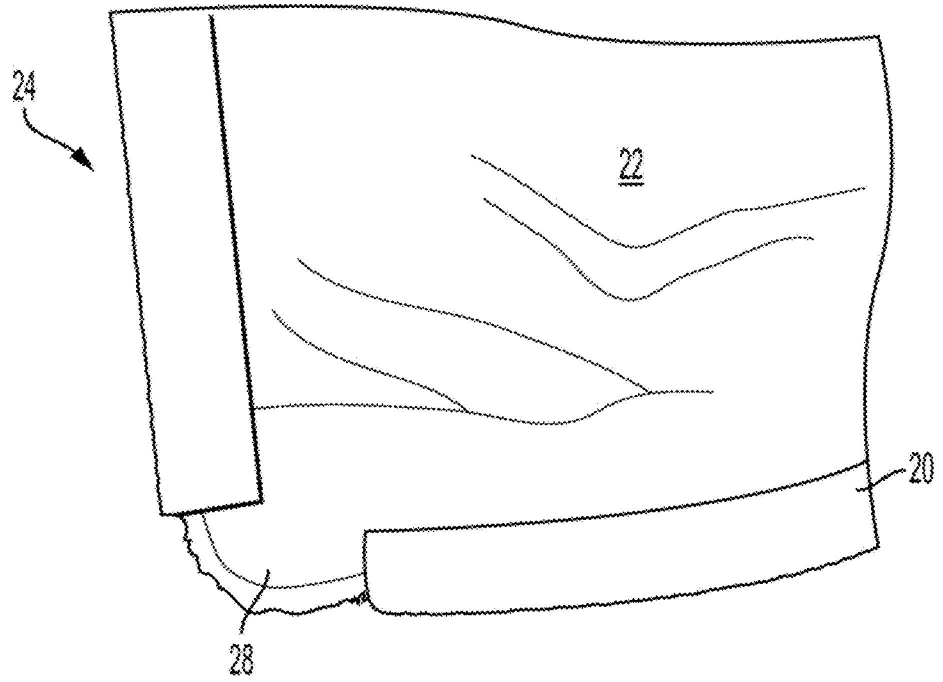
FIG. 7 illustrates an exploded view of a corner of the display with strips of material adhered to a substrate, in accordance with one embodiment.

FIG. 7 illustrates an exploded view of a corner of a display 24 with strips of material 20 adhered to edges of a substrate 22, in accordance with one embodiment. More specifically, FIG. 7 illustrates a first strip of material adhered along a landing position on a first edge of a fabric piece and a second strip of material adhered along a landing position on a second edge of a fabric piece. The landing position along each edge is selected such that the strips of material on each landing position do not fully contact one another. Accordingly, the corner 28 between the strips of material 20 is open.

A method for adhering or attaching a strip of material to a substrate to form a display is disclosed. The method comprises melting the strip of material to the substrate. For example, the method may comprise welding a strip of resin material to a fabric substrate. In one embodiment, the method comprises RF welding the strip of material to the fabric. In alternative embodiments, any type of welding, including, for example, sonic welding, may be used.

Figure 8:
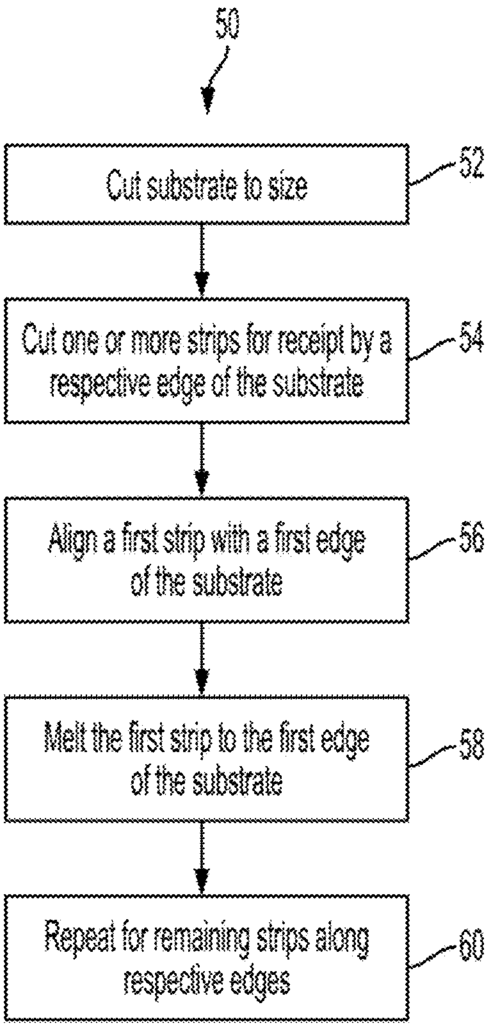
FIG. 8 illustrates a method for producing a display, in accordance with one embodiment.

FIG. 8 illustrates a method 50 of applying a strip of material, such as a keder, to a substrate to produce a display, in accordance with one embodiment. A substrate, such as a fabric piece, is cut 52 to size for receipt by a frame. One or more strips of material are cut 54 for receipt by and adhesion to a respective edge of the substrate. In some embodiments, the length of a strip of material may be less than a length of the edge of the substrate that receives the strip of material. A first strip of material is aligned with a landing position on a first edge of the substrate 56. The first strip of material is melted to the substrate 58, for example using RF welding, at a temperature above the melting point of the material strip but below the melting point of the material of the substrate. The strip of material thus is melted and partially integrated into the substrate, achieving adhesion to the substrate. The same process is repeated 60 for each remaining strip of material along respective edges of the substrate, for example along second, third, and fourth edges of the substrate.

In some embodiments, RF welding of each strip of material to the substrate comprises setting the substrate and strip of material on the bed of an RF welder, the strip(s) of material being placed on the landing position of the substrate. The strip of material is welded to the substrate using a welding tool of the RF welder.

Figure 9:
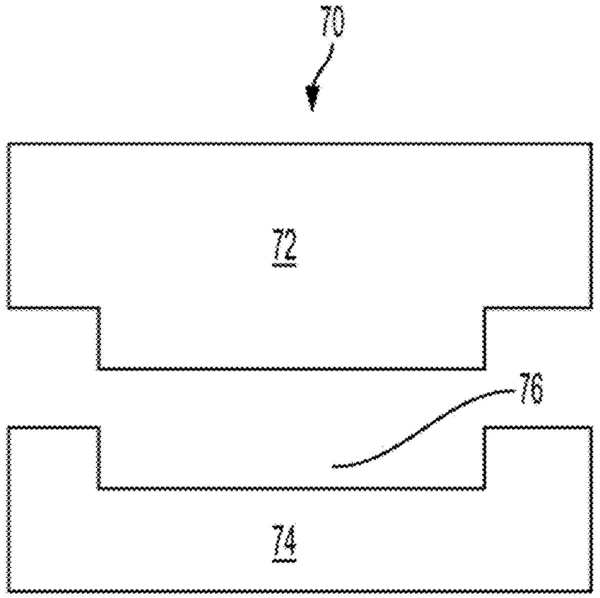
FIG. 9 illustrates an end view of a welding tool.

The welding tool moves along the bed, welding at increments. For example, regardless of bed length (up to, for example, 25 meters), a welding tool is generally no more than 5 feet long. Accordingly, welding may be done at increments of 5 feet or less. It is to be appreciated that the length of the bed and the size of the welding tool may be varied depending on the pieces to be processed on the bed. FIG. 9 illustrates an end view of a welding tool 70. The welding tool 70 includes a male piece 72 and a female piece 74. The female piece 74 includes a bed 76. The shape of the bed 76 determines the after-melt (and resolidification) shape of the strip of material.

After the first strip of material is welded along the landing position on the first edge of the substrate, the substrate may be removed from the RF welder. The substrate and a second strip of material are set in position on the bed of the RF welder, the second strip of material being placed on the landing position of the substrate. High frequency energy melts the strip of material and the welding tool presses it into the substrate. The process is repeated until all desired strips of material are adhered at respective landing positions on all desired edges of the substrate. During welding, a tab may be added to at least one of the edges of the display. This may be done by laying a tab over the strip of material on the welding bed. The tab may be a material that is intended to have integrity after welding such that it can be used to remove the display from a frame after use.

RF welding uses high-frequency electromagnetic energy. The materials to be welded are placed between two electrodes or metal bars. When the electrodes are pressed together, high-frequency electromagnetic energy waves (for example, 27.1 MHz) are passed there between, creating a rapidly alternating electric field. Molecules in the materials begin to oscillate, realigning themselves to conform to the polarity of the energy field and releasing thermal energy in the process.

In one embodiment, the RF welding applies an electrical charge to the substrate and strip of material. The charge voltage and timing is selected to melt the strip of material but not melt the substrate (and ink applied to the fabric if printing is done before welding). RF welding comprises applying a number of volts to the substrate and strip of material for a period of time.

The strip of material, or keder, is at least partially melted and the substrate, or fabric, is not melted. The liquid material of the strip travels into fibers of the substrate. As the liquid solidifies, the material of the strip becomes adhered to the substrate. As discussed above, only a portion of the material of the strip may be received by the substrate and it is expected that some portion of the material will remain above the substrate and solidify.

The welded strip of material does not bleed into a graphic or otherwise compromise a graphic printed on the substrate. The substrate may be printed with a graphic before or after being cut but before welding of the strip of material to the fabric piece. If printed before welding, the welding charge may be selected such that the effective temperature is below the melting point of the ink used in printing. Alternatively, a graphic may be printed after the strip of material is welded to the substrate.

Using welding to adhere the strip of material to the substrate eliminates the need to seal the edge of the substrate (commonly done by cutting the substrate with a laser) because the substrate cannot fray past the interface of the strip of material and the substrate. Accordingly, using welding reduces production time of a display for a soft signage piece by both adhering the strip of material to the substrate and sealing the edge of the substrate.

Figure 10A:
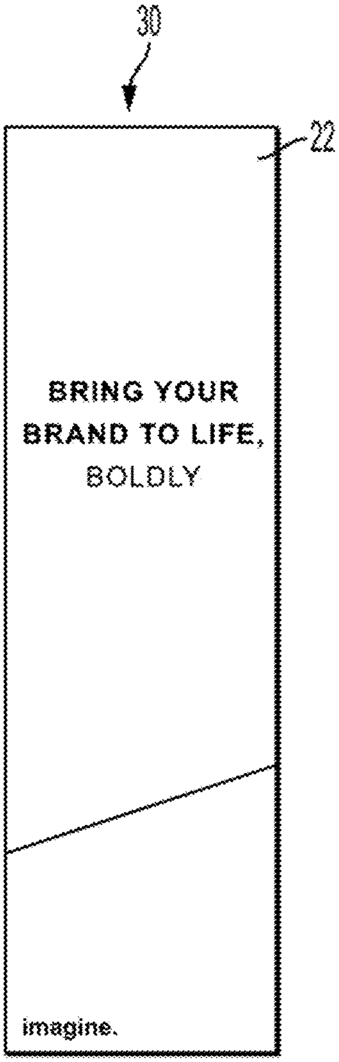
FIG. 10*a* illustrates a front view of a completed soft signage piece comprising a graphic display in place in a frame, in accordance with one embodiment.
Figure 10B:
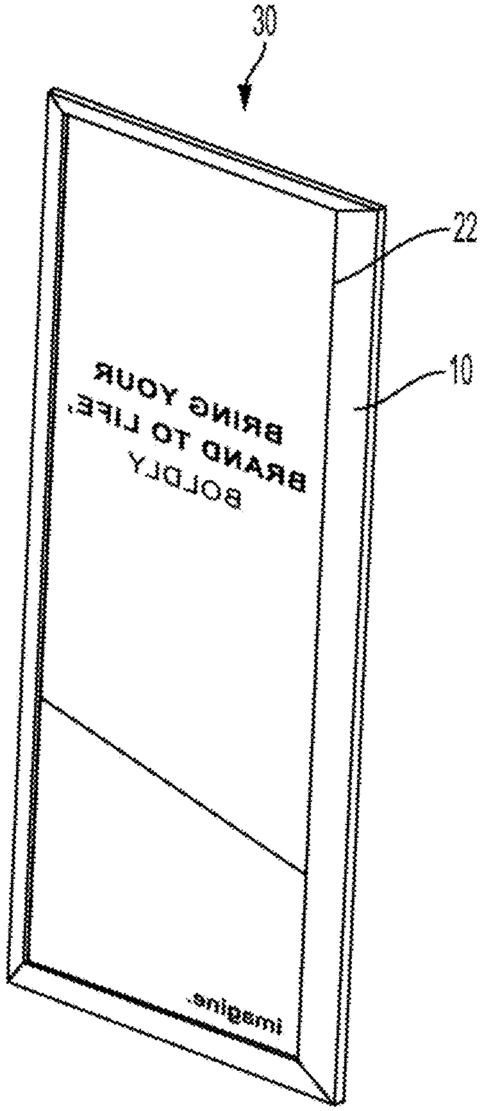
FIG. 10*b* illustrates a rear view of a completed soft signage piece comprising a graphic display in place in a frame, in accordance with one embodiment.

FIGS. 10*a* and 10*b* illustrate a completed soft signage piece 30 comprising a graphic display 22 in place in a frame 10, in accordance with one embodiment. FIG. 10*a* illustrates a front view. FIG. 10*b* illustrates a rear view. To use the graphic display, the substrate edges, having strips of material adhered thereto, are pressed into associated slots of a frame. The graphic display, comprising the substrate with a strip of material adhered thereto, stays in place in the slot by a friction fit.

After use, the strip of material and the display are removed from the frame using force to overcome the friction fit. This can be done by gripping a tab and pulling the graphic display from the frame. The strip of material can then be removed from the substrate by pulling on the strip of material. The substrate then may be recycled. The amount of time needed to pull the strip of material from the substrate is significantly less than the amount of time needed to remove threading from a sewn in keder.

The present disclosure provides a method of welding a strip of material, such as a keder, to a substrate to produce a display for soft signage that is not labor intensive and wherein the strip of material may be easily removed from the substrate, and the display resulting from such welding. The method reduces the cost of producing a soft signage graphic display by removing labor and speeding up the process. The method further facilitates removing the welded keder such that the substrate may be recycled. The disclosed method can be useful for any application where a strip of material is applied to a substrate such as a fabric.

Advantages of the disclosed method include, but are not limited to:

Speed. Any suitable cycle time may be used. In some embodiments, the disclosed method can accommodate welding of 76" of keder in about a 7-12 second cycle time—for example with a 5 second seaming time and a 3 second cooling time. The same 10'×20' sign takes about 2-3 minutes to finish by welding and 10 minutes by a skilled sewer.

Accuracy. Welding may be performed using a machined steel or aluminum tool of a welding machine. Accordingly, the weld is as straight as machined steel. Sewing has a higher chance for error, especially the larger a sign becomes, due to a human needing to aim the fabric and keder through a sewing machine.

Removability. The welded strip of material is easily removed from the fabric merely by pulling on the strip of material, breaking the bond between the strip of material and the fabric.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure, their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A method of making a soft signage piece, the method comprising:

forming a display, wherein forming a display comprises:

providing a substrate;

providing at least one strip of material; and adhering the strip of material to the substrate by melting the strip of material into the substrate proximate a substrate edge, wherein melting the strip of material does not melt the substrate;

allowing the strip of material to solidify;

providing a frame, the frame having an opening and a slot extending proximate a periphery of at least one edge of the frame; and inserting the strip of material adhered to the substrate into the slot.

2. The method of claim 1, wherein melting the strip of material into the substrate is done using RF welding.

3. The method of claim 1, further comprising printing a graphic on one side of the substrate.

4. The method of claim 1, wherein the strip of material comprises a resin.

5. The method of claim 1, wherein the strip of material is adhered to the substrate at a landing position on the substrate.

6. The method of claim 5, wherein the substrate has a substrate area and the frame has a frame area; and wherein the landing position is a portion of the substrate area that extends beyond the frame area.

7. The method of claim 1, wherein inserting the solidified strip of material and adhered substrate into the slot achieves a friction fit.

8. The method of claim 1, wherein providing at least one strip of material comprises providing four strips of material, and adhering the material comprises adhering each strip of material to the substrate proximate a different substrate edge.

9. The method of claim 1, wherein the strip of material is a keder.

10. The method of claim 1, wherein the substrate is porous and the strip of material melts into pores of the substrate.

11. The method of claim 1, wherein the strip of material is rectangular.

12. A method of making a soft signage piece, the method comprising:

forming a display, wherein forming a display comprises:

providing a substrate;

providing at least four strips of material; and melting each strip of material proximate a corresponding substrate edge, wherein melting the strip of material does not melt the substrate;

allowing the strips of material to solidify;

providing a frame, the frame having an opening and a slot extending along each edge of the frame; and inserting the solidified strips of material adhered to the substrate into the slot.

* * * * *